United States Patent [19]

Harris

[11] Patent Number: 5,294,045

[45] Date of Patent: Mar. 15, 1994

[54] TEMPERATURE AND FLOW CONTROL VALVE

[76] Inventor: Kevin R. Harris, 833 E. Helen St., Tucson, Ariz. 85719

[21] Appl. No.: 58,327

[22] Filed: May 10, 1993

[51] Int. Cl.$^5$ ............................................. G05D 23/12
[52] U.S. Cl. ................................. 236/12.12; 137/3; 137/605
[58] Field of Search .................... 236/12.12, 12.11; 137/605, 599, 3

[56] References Cited

U.S. PATENT DOCUMENTS

| | | | |
|---|---|---|---|
| 3,702,619 | 11/1972 | Son | 137/3 |
| 4,170,245 | 10/1979 | Haley | 137/487.5 |
| 4,635,844 | 1/1987 | Barrett, Sr. | 236/12.12 |
| 4,757,943 | 7/1988 | Sperling et al. | 235/12.12 |

Primary Examiner—William E. Wayner
Attorney, Agent, or Firm—Antonio R. Durando; Harry M. Weiss

[57] ABSTRACT

A temperature and flow rate controller consisting of a first bank of three-port solenoid-actuated valves for temperature control in series with a second bank of two-port on/off solenoid valves for flow rate control. Each three-port valve has two input ports connected to a cold and a hot stream source, respectively, and an output port connected to a common discharge chamber wherein the throughput from all valves is mixed and reaches an average temperature. These valves are always open, either to the cold or the hot source, and the temperature of the combined discharge is set by the relative position of each valve in the bank; therefore, the total flow rate through the first bank of valves remains constant regardless of the valve settings required to yield the desired temperature. The output of the first bank of valves is regulated by the second bank of on/off valves, which is disposed in series therewith. Each of these valves is either open or closed, thus permitting the setting of the downstream pressure and, correspondingly, of the flow rate to a desired throughput by incremental adjustments achieved by digital control means. In another embodiment of the invention, the flow rate is regulated with a globe or equivalent valve actuated either manually or by a stepper motor.

14 Claims, 1 Drawing Sheet

TEMPERATURE AND FLOW CONTROL VALVE

BACKGROUND OF THE INVENTION

1. Field of the Invention

This invention is related in general to the field of temperature and flow controllers and, in particular, to methods and apparatus suitable for digital operation.

2. Description of the Related Art

Everyone is familiar with the process of adjusting the water temperature out of a faucett or shower head by balancing the flow rate through hot and cold water valves. Obviously, in order to raise the outlet water temperature, either the hot water flow is increased or the cold water flow is decreased; and the opposite procedure is followed to lower the water temperature. This process necessarily affects the overall flow rate and often requires a readjustment of each valve to produce the desired total output as well as the desired temperature.

Thus, the process may lead to an undesirable waste of water and time, hardly acceptable in a modern world of heightened ecological consciousness, comfort and computerized appliances. Therefore, several devices have been developed to control both the flow rate and the temperature of water flowing to an outlet. In particular, U.S. Pat. No. 4,170,245 to Haley (1979) describes a digital control valve comprising a plurality of parallel channels containing separate on/off valves actuated by individual solenoids. Each channel is sized in binary progression, so as to deliver flow rates compatible with computer logic for digital control. The overall flow rate can be adjusted to a desired quantity by selecting the appropriate channels of flow; the rate will be precise within a tolerance determined by the smallest orifice.

U.S. Pat. No. 4,757,943 to Sperling et. al. (1988) uses the same concept in the design of a liquid-flow temperature controller. By combining a valve of the type described by Haley with a temperature sensor and digital controller, this invention provides an apparatus for automatically setting the liquid temperature to a desired level. The flow of both hot and cold water is regulated by separate flow controllers consisting of a plurality of digital, solenoid-driven on/off valves; the temperature of the resulting mixture is measured by a sensor and fed to a temperature controller; the controller determines an error with respect to a setpoint and actuates the appropriate solenoid/driven valves according to a predetermined feedback control scheme. This patent also takes into account the nonlinearity between flow rates and orifice diameters, and the effect of temperature on viscosity, in order to produce a precise balancing of flow rates to achieve a targeted temperature.

These systems utilize banks of on/off solenoid valves that are either completely open, thus allowing a flow proportional to the size of the orifice in the valve, or completely closed, thus allowing no flow at all. In regulating flow rate, the correct combination of valves to produce the desired rate is kept open, leaving the balance closed. This permits a binary system of control for achieving a precise flow rate within the capacity of the smallest valve. Similarly, in regulating temperature, the correct number of valves on the hot and cold water banks are opened to produce respective flow rates that yield the desired combined temperature. As each valve is either opened or closed, though, the total flow rate is affected, thus requiring the same process of temperature and flow rate balancing inherent with manual operation.

Even if the two inventions are combined for automatic flow and temperature control, the two units will necessarily affect one another and function dependently, so that the control of the two parameters will require an iterative control procedure converging to the desired setpoints. This is essentially what occurs when temperature and flow rate are set manually. Therefore, there still exists a need for a valve system that automatically and independently controls the rate of delivery and the temperature of a liquid to desired setpoints.

BRIEF SUMMARY OF THE INVENTION

It is therefore an object of this invention to provide valve apparatus capable of controlling the temperature of a fluid by mixing appropriate proportions of hot and cold fluid streams without affecting the flow rate of the combined mixture.

It is another object of the invention to provide valve apparatus that is capable of setting the flow rate of the combined stream to a desired setpoint without affecting the temperature of the stream.

It is a further goal of the invention to provide the abovedescribed functions by means of solenoid-actuated valves that permit the control of the apparatus by digital means.

Yet another objective is an apparatus that utilizes a reduced number of independent valves for temperature control.

Finally, an objective of this invention is the realization of the above mentioned goals in an economical and commercially viable manner. This is achieved by using commercially available components and materials, modified only to the extent necessary to fit the requirements of the invention.

Therefore, according to these and other objectives, the present invention consists of a first bank of three-port solenoidactuated valves for temperature control in series with a second bank of two-port on/off solenoid valves for flow rate control. Each three-port valve has two input ports connected to a cold and a hot stream source, respectively, and an output port connected to a common discharge chamber wherein the throughput from all valves is mixed and reaches an average temperatures. These valves are always open, either to the cold or the hot source, and the temperature of the combined discharge is set by the relative position of each valve in the bank; therefore, the total flow rate through the first bank of valves remains constant regardless of the valve settings required to yield the desired temperature. The output of the first bank of valves is regulated by the second bank of on/off valves, which is disposed in series therewith. Each of these valves is either open or closed, thus permitting the setting of the downstream pressure and, correspondingly, of the flow rate to a desired throughput by incremental adjustments achieved by digital control means. In another embodiment of the invention, the flow rate is regulated with a globe or equivalent valve actuated either manually or by a stepper motor.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose only some of the various ways in which the invention may be practiced.

DETAILED DESCRIPTION OF THE PREFERRED EMBODIMENTS

This invention consists in part in the utilization of a bank of three-port valves to regulate the temperature of a liquid flowing through the bank at a constant flow rate. The use of three-port valves, rather than on/off valves, makes it possible to regulate the temperature at constant throughput and with an overall reduced number of valves.

Figure 1:
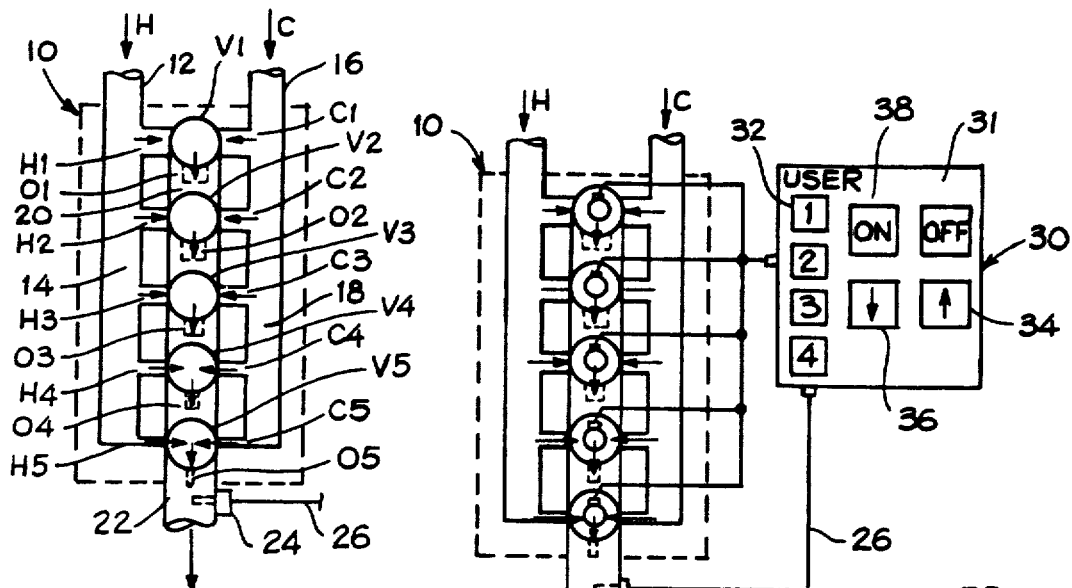
FIG. 1 is a schematic view of a temperature-control valve assembly according to the present invention.

Referring to the drawings, like parts are designated throughout with like numerals and symbols. FIG. 1 illustrates in schematic representation the pattern of liquid flow through a temperature-control valve assembly 10, whereby hot water H is fed to a hot water line 12 connected to a hot water manifold 14 housed within the assembly 10. Similarly, cold water C is fed to a cold water line 16 connected to a cold water manifold 18 also housed within the assembly 10. Reference to water throughout this specification is made only as an example of a suitable liquid for the valve system of this invention, which could obviously be used in equivalent manner with any other liquid. A bank of three-port solenoid valves V-V$_5$ (normally referred to as three-way valves in the industry) is disposed in the assembly 10 with one input port (H$_1$-H$_5$) connected to the hot water manifold 14 and the other input port (C$_1$-C$_5$) connected to the cold water manifold. Each valve is sized for a different predetermined throughput under normal operating conditions (the water pressure and temperatures available at the point of use), preferably in binary increments, and the output of all valves is discharged to a common output manifold 20 where the individual-valve flow rates are mixed to achieve a combined temperature. Obviously, the resulting temperature will vary between the temperature of the cold water, when all valves are open to the cold stream C, and the temperature of the hot water, when all valves are open to the hot stream H. The setting of each valve determines the exact temperature of the output as a linear interpolation between the cold and hot temperatures in direct proportion to the total cold and hot flow rates. Because each valve is controlled by a solenoid that connects the output port to either the cold or hot water manifold, every valve is always open to flow and the total throughput remains unchanged during operation. This is a great advantage over the use of two separate banks of two-way valves, wherein one is connected to the cold and the other to the hot water source and the throughput is altered as different valves are opened and closed.

Thus, for example, using a 5-valve system (1-5) having respective capacities of q, 2q, 4q, 8q and 16q, the total flow rate out of the assembly will be constant and always equal to 31q. Note that the value of q, and therefore the precise rate through each valve, is determined by the characteristics of the valve and the pressure drop across the valve assembly. Given input temperatures $T_C$ and $T_H$ for the cold and hot water streams, respectively, the temperature $T_{OUT}$ of the output stream can be calculated according to the equation:

$$T_{out} = T_H - (\text{Cold Flow Rate})/(\text{Total Flow Rate})(T_H - T_C).$$

Thus, for example, if $T_C$ and $T_H$ are 60 to 120 degrees Fahrenheit, respectively, and if valves 2 and 4 are open to the cold water and valves 1, 3 and 5 to the hot water, the resulting temperature will be 120−10 q/31 q (120−60)=100.6° F. therefore, it is clear that $T_{out}$ may be adjusted to any temperature within the 60°-120° F. range within a tolerance proportional to the smallest available increment of flow rate (q in the given example).

A five-valve bank is described here for illustration purposes, but any number of three-way valves can similarly be used to practice the invention. If the capacities of the valves are chosen in binary increments (that is, each valve has twice the capacity of the next smaller valve), the output temperature can be set in increments equal to the temperature difference between hot and cold water multiplied by the ratio of the smallest capacity to the total capacity. Using the valves and temperatures described above, for instance, the output temperature can be set in increments of (1/31)×(120−60)=1.93° F. Thus, it is readily apparent that the binary nature of a temperature control system constructed according to this invention affords as high a degree of precision as desired, as determined by the total number of valves utilized. In addition, and most importantly, this system provides a temperature controller that does not influence the flow rate through it. Therefore, the control of the throughput remains a separate and independent operation that neither affects nor is affected by the temperature control. This is a valuable feature that distinguishes the present invention from any combination of the valve systems described in the prior art.

Figure 2:
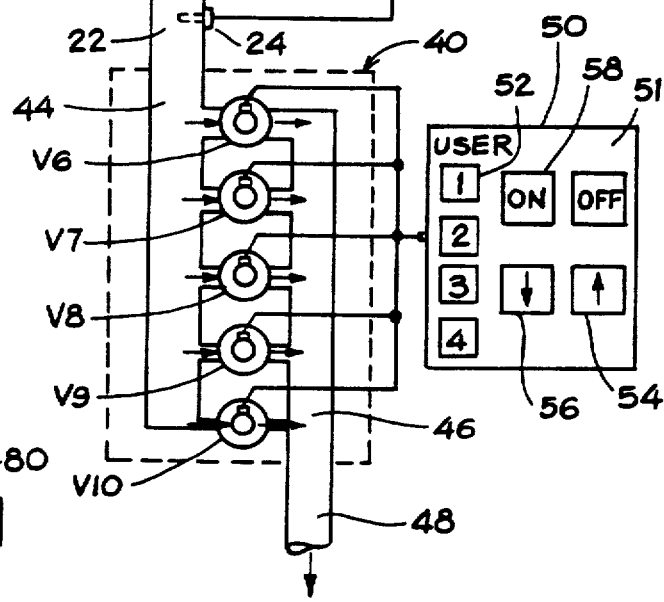
FIG. 2 is a schematic representation of the valve assembly of FIG. 1, including a feedback-control loop utilized to automatically drive the output temperature to a desired setpoint, in combination with an automatic flow rate controller.

In operation, the control system of this invention utilizes known technology to provide the feedback-control loop required to set the state (open to hot or to cold) of each valve $V_1$-$V_5$ by either energizing or deenergizing the valve's solenoid. As illustrated in FIG. 2, a temperature sensor 24 (such as a thermocouple) is placed within the output line 22 of the valve assembly 10 (such as through an orifice bored in the wall of the line or housing) to measure the temperature $T_{out}$ at the outlet of the assembly. An electrical signal corresponding to the outlet temperature (typically generated by analog-to-digital conversion of a linear temperature transducer's output) is transmitted through wires 26 to a microprocessor unit 30 where $T_{out}$ is compared to a setpoint temperature $T_{set}$ established by a user to determine the difference or error E. As illustrated in the control panel 31 of the microprocessor unit, multiple key 32 may be available for different users (1 through 4 in the drawing) to set and store a desired $T_{set}$ by either increasing (key 34) or decreasing (key 36) a previous setpoint stored in memory. Depending on the magnitude and sign of the error E, the microprocessor is programmed to alter the state of certain valves to either increase or decrease the hot-to-cold water ratio according to a predetermined feedback strategy embodied in a look-up table stored in memory. As a new outlet temperature corresponding to the latest hot-to-cold water ratio is measured by the sensor 24, a new error is generated and corresponding changes to the state of the valves may be effected to further refine the outlet temperature.

Once the temperature of the water stream flowing out of the valve assembly 10 is set to a desired level, the flow rate can then be regulated independently downstream. As shown in FIG. 2, a flow controller 40 may be used in series with the temperature controller to regulate the flow rate by restricting the flow area with a bank of two-way on/off valves $V_6$–$V_{10}$ in parallel arrangement between an inlet manifold 44 and an outlet manifold 46. As in the case of the temperature controller, these valves are preferably chosen with binary incremental capacities (that is, if $V_6$ has capacity q, $V_7$ has 2 q, V, has 4 q, etc.). Since these valves are either on or off, the total throughput to the outlet conduit 48 is determined by the combination of open valves at any given time. Obviously, valves $V_6$–$V_{10}$ should be sized to have a total capacity (when all valves are open) equal to the capacity of the temperature controller 10 (i.e., 31 q in the example illustrated).

A second microprocessor unit 50, which may be incorporated within unit 30, is used to set the flow rate through the valve assembly 40 to a predetermined desired level stored in memory by a user. As illustrated on the control panel 51 of the microprocessor unit 50, keys 52, 54 and 56 are provided for a user to choose an identifying code (1–4) and select a f low-rate setpoint $q_{set}$ by either increasing (key 54) or decreasing (key 56) a previous setpoint stored in memory. A system with n binary valves with the smallest valve having capacity q permits $2^n$ discrete f low rate settings varying from 0 to maximum at increments of q. A user can set the desired flow rate by either increasing or decreasing the existing rate by means of keys 54 and 56, respectively, while the flow rate controller is on, and the new setting can be stored in the microprocessor's memory for future recall by a user by means of keys 52. Obviously, different control logic could easily be devised by one skilled in the art to allow equivalent utilization of the apparatus of the invention.

Thus, a completely automated temperature and flow control apparatus is described that permits a user a choice of outlet rate and temperature without the need for any valve manipulation. When the flow rate controller is turned on (switch 58) and the user is selected (keys 52), the microprocessor 50 automatically actuates the correct combination of solenoids in the valve bank $V_6$–$V_{10}$ to produce the desired throughput. This also establishes the flow rate through the temperature controller 10 which, upon activation of the microprocessor unit 30 (by switch 38), automatically regulates the output temperature to the value of $T_{set}$ stored in memory for the particular user. Obviously, the two units 30 and 50 may be combined to comprise a single control panel whereby both the temperature and flow rate controllers are turned on by a single switch and the temperature and rate setpoints for a given user are recalled from memory by a single operation. The same unit would then automatically set both flow rate and temperature without further need for interaction by a user other than to change either or both of the setpoints.

Alternatively, the flow rate controller may consist of a conventional valve placed downstream of the temperature controller 10. As shown in schematic form in FIG. 3, such a valve may be a manually-operated outlet valve 60 (such as to a faucet or shower head), which functions in analog fashion independently of the temperature controller. This setup has the advantage over standard plumbing of permitting a user to vary the output rate without affecting, even temporarily, the temperature of the water.

Figures 3, 4:
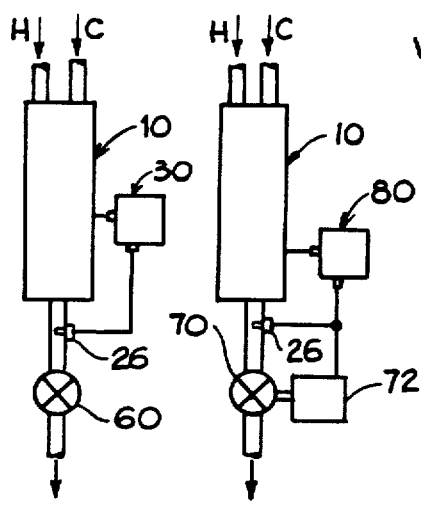
FIG. 3 is a schematic representation of a system utilizing the temperature controller of the invention in combination with a manually-operated valve.
FIG. 4 is a schematic representation of a system utilizing the temperature controller of the invention in combination with a valve automatically actuated by a stepper motor.

In yet another embodiment illustrated in the schematic representation of FIG. 4, the flow rate controller consists of a valve actuated by a digital driver 72, such as a stepper motor, compatible with microprocessor control. A single microprocessor unit 80 may control the functions of both the temperature controller 10 and the driver 72 according to predetermined logic equivalent to the procedure described above.

The principal components of the various embodiments of this invention are available as off-the-shelf parts in the commercial market. Therefore, the invention can be implemented by connecting these parts through appropriate plumbing and wiring in a suitable housing, as one skilled in the art would know. For instance, three-way valves of the type described are sold by Plast-O-Matic Valves, Inc. of Totowa, N.J., under the THP Series Model Numbers. Two-way valves are also available from Plast-O-Matic Valves, Inc. as part of the same model series. Microprocessor units that can be programmed for the described functions and capable of receiving heat sensor signals are sold by Microchip Technology Inc. of Phoenix, AZ, as part of its CMOS Microcontrollers Series, such as Part Number PIC16C71.

While the embodiments of the process and apparatus illustrated in the figures feature the specific steps and shapes therein described, the invention can obviously take other steps and shapes with equivalent functionality and utility. Various changes in the details, steps and materials that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is therefore not to be limited to the details disclosed herein but is to be accorded the full scope of the claims so as to embrace any and all equivalent apparatus and methods.

I claim:

1. An apparatus for controlling the temperature of a discharge liquid stream resulting from the combination of a relatively hot liquid stream and a relatively cold liquid stream, comprising:
   (a) a hot stream manifold for receiving a hot-stream input at a predetermined hot temperature;
   (b) a cold stream manifold for receiving a cold-stream input at a predetermined cold temperature below said predetermined hot temperature;
   (c) a plurality of three-port valves, each valve having one first and one second input port and one output port, said first input port being hydraulically connected to said hot-stream manifold, said second input port being hydraulically connected to said cold-stream manifold, and said output port of each of said valves being always open to either said first or said second input port;

(d) a discharge manifold hydraulically connected to said output port of each of said three-port valves for receiving an output stream from each of the three-port valves, thereby providing a mixing chamber for combining the output streams from all said three-port valves into a single discharge liquid stream;

(e) temperature-sensing means disposed in said discharge manifold for monitoring the temperature of said single discharge liquid stream; and (f) means responsive to said temperature-sensing means for causing selected ones of said plurality of three-port valves to be open to said cold stream manifold and the remaining valves to be open to said hot stream manifold, such that said single discharge liquid stream has a temperature approximately equal to a predetermined temperature setpoint.

2. The apparatus described in claim 1, wherein said three-port valves are sized to produce flow rates that increase in binary relationship.

3. The apparatus described in claim 2, wherein said three-port valves are solenoid actuated.

4. The apparatus described in claim 3, wherein said means for causing selected ones of said plurality of three-port valves to be open to said cold stream manifold and the remaining valves to be open to said hot stream manifold consists of a microprocessor capable of actuating said three-port valves according to a predetermined feedback-control logic.

5. The apparatus described in claim 4, wherein said temperature-sensing means consists of a thermocouple.

6. The apparatus described in claim 3, further comprising:

(g) flow-rate-controlling means, hydraulically connected to said discharge manifold, for regulating the flow rate of said discharge liquid stream.

7. The apparatus described in claim 6, wherein said flow-rate-controlling means comprises:

(h) a plurality of on/off valves disposed substantially in parallel-flow configuration, each valve having an input port connected to said discharge manifold and an output port connected to a common outlet conduit, and each valve being always either open or closed; and (i) means for causing selected ones of said plurality of on/off valves to be open or closed, such that said outlet conduit has a flow rate approximately equal to a predetermined flow-rate setpoint.

8. The apparatus described in claim 1, wherein said means for causing selected ones of said plurality of three-port valves to be open to said cold stream manifold and the remaining valves to be open to said hot stream manifold consists of a microprocessor capable of a actuating said three-port valves according to a predetermined feedback-control logic.

9. The apparatus described in claim 8, wherein said microprocessor is programmable by at least one user for selecting a desired temperature setpoint corresponding to each of said at least one user.

10. The apparatus described in claim 1, wherein said temperature sensing means consists of a thermocouple.

11. The apparatus described in claim 1, further comprising:

(g) flow-rate-controlling means, hydraulically connected to said discharge manifold, for regulating the flow rate of said discharge liquid stream.

12. The apparatus described in claim 11 wherein said flow-rate-controlling means comprises:

(h) a plurality of on/off valves disposed substantially in parallel-flow configuration, each valve having an input port connected to said discharge manifold and an output port connected to a common outlet conduit, and each valve being always either open or closed; and (i) means for causing selected ones of said plurality of on/off valves to be open or closed, such that said outlet conduit has a flow rate approximately equal to a predetermined flow-rate setpoint.

13. The apparatus described in claim 11, wherein said flow-rate-controlling means consists of a manually-operated valve.

14. The apparatus described in claim 11, wherein said manually operated valve is actuated by a stepper motor.

* * * * *